United States Patent Office 3,553,205
Patented Jan. 5, 1971

3,553,205
METHOD OF PRODUCING 7-NITROSUBSTITUTED 1,4-BENZODIAZEPINES
Poul Nedenskov, Birkerod, Denmark, assignor to Aktieselskabet Grindstedvaerket, Jens Baggesensvej, Arhus, Denmark, a firm
No Drawing. Filed Feb. 20, 1968, Ser. No. 706,795
Claims priority, application Great Britain, Feb. 28, 1967, 9,393/67
Int. Cl. C07d 53/06
U.S. Cl. 260—239.3
4 Claims

ABSTRACT OF THE DISCLOSURE

The invention relates to a new method of producing 7-nitro-di- and -tetrahydro-5-phenyl-2H-1,4-benzodiazepin-2-ones by introducing the phenyl group in 5-position in the corresponding N-oxides by a Grignard reaction.

This invention relates to a new method of producing 7-nitrosubstituted 1,4-benzodiazepines of the general formula:

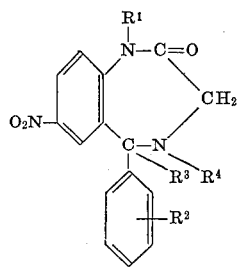

I wherein $R^1$ represents hydrogen or an alkyl group of up to 6 carbon atoms, $R^2$ represents hydrogen, halogen, a trifluormethyl group, or an alkyl or alkoxy group of up to 6 carbon atoms, and $R^3$ represents hydrogen if $R^4$ is a hydroxyl group, or $R^3$ and $R^4$ together represents a further bond between the carbon atom and the nitrogen atom.

The compounds of Formula I are intended for use as drugs, having a sedative, relaxing, and anticonvulsant effect, and at least one of them, viz. 1,3-dihydro-7-nitro-5-phenyl-2H-1,4-benzodiazepin-2-one, has proved excellent as a reliable sopoforic largely free from side effects and of strikingly low toxicity.

In the known methods of producing the said compounds, the starting materials are ortho-aminobenzophenones which are reacted with chloroacetyl chloride, after which a ring closure is effected by reaction with ammonia, and finally a nitration is effected to introduce the 7-nitro group.

The said starting materials being rather costly, and often not easily available, it is the main object of the present invention to provide a new method, in which an easily available and fairly cheap starting material is used, namely 2-nitrobenzaldehyde, the following scheme of reactions illustrating the present method:

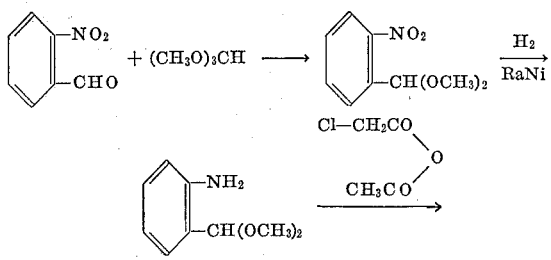

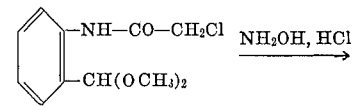

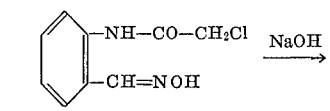

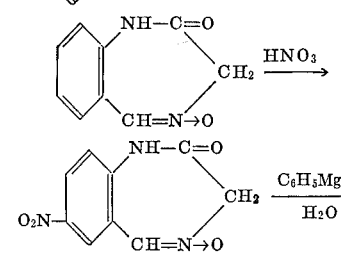

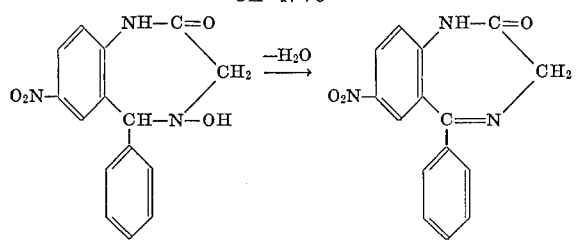

It is surprising that the phenyl group in 5-position can be introduced by a Grignard reaction after the introduction of the nitro group in the 7-position of the benzodiazepines, since nitro groups are generally attacked by Grignard reagents.

Accordingly, the present method is characterized in the step of subjecting benzodiazepine-N-oxides of the general formula:

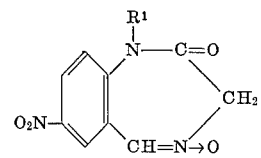

II wherein $R^1$ is as hereinbefore defined, to a Grignard reaction with a reagent of the formula:

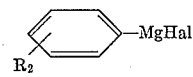

wherein $R^2$ is as hereinbefore defined, and Hal represents a halogen atom, such as a bromine atom, after which, if desired, the resulting compounds of the general formula

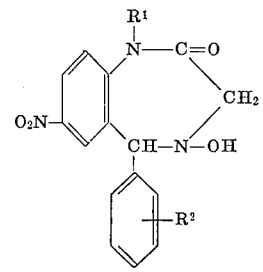

are finally dehydrated.

The present method is further illustrated by the following examples.

EXAMPLE 1

9.05 g. (0.060 mole) of 2-nitrobenzaldehyde are mixed with 7.3 g. (0.068 mole) of 98% orthoformic acid trimethyl ester, 0.15 g. of ammonium chloride, and 8 ml. of methanol, the resulting mixture being refluxed for 18 hours.

After filtration and evaporation in vacuo at 60° C. and 20 mm. Hg, the residue is shaken with 100 ml. of ether and 20 ml. of a 6% sodium hydrogen carbonate solution. The ethereal solution is separated, dried over magnesium sulphate, and evaporated in vacuo at 60° C. and at a final pressure not exceeding 15 mm. Hg, leaving 11.48 g. of an oily residue, which on distillation yields 10.54 g. of 2-nitrobenzaldehyde dimethyl acetal as a slightly yellow oil with B.P.$_{0.6}$ 86–88° C., and $n_D^{25}$ 1.5150.

4.1 g. (0.021 mole) of the said acetal, and 100 mg. of potassium acetate are dissolved in 45 ml. of methanol, and the solution is shaken for 5 hours with 2.0 g. of Raney nickel under 4 atmospheres hydrogen pressure at room temperature.

The reaction mixture is filtered, and the filtrate is evaporated in vacuo. The oily residue is suspended in 60 ml. of ether, the suspension being stirred with magnesium sulphate, and filtered, after which the ether is evaporated in vacuo.

The residual light yellow oil in an amount of 3.55 g. is dissolved in 10 ml. of dry, freshly distilled trichloroethylene. A solution of the mixed anhydride of acetic acid and chloroacetic acid is prepared from 2.7 g. of sodium acetate, and 2.55 ml. of chloroacetyl chloride in 50 ml. of trichloroethylene, and added in one portion.

The reaction mixture is stirred overnight at room temperature, filtered, and evaporated in vacuo to dryness. The yellow oily residue is dissolved in 70 ml. of ether, and the solution is washed with 40 ml. of 6% sodium hydrogen carbonate solution and dried with sodium carbonate. The ether is distilled in vacuo, leaving 4.66 g. of the acylated acetal as a yellow oil.

These 4.66 g. are dissolved in 75 ml. of methanol, the solution being heated to boiling. A solution of 3.0 g. (0.044 mole) of hydroxylamine hydrochloride in 20 ml. of water is added in one portion, and the stirred mixture is heated to boiling for 5 minutes. Then 15 ml. of water is added, and the slightly turbid solution is stirred for one hour. The temperature is now 25° C., and white crystals are separated. Another 10 ml. of water is added, and the mixture is cooled to −20° C. The crystalline precipitate is isolated by filtration, washed twice with 25 ml. of water, once with 3 ml. of ether, and once with 5 ml. of benzene, and finally dried, yielding 2.76 g. of 2'-formyl-2-chloroacetanilide oxime as white crystals, melting at 180° C. (Kofler hot stage).

2.1 g. (0.010 mole) of the said oxime is stirred with 20 ml. of methanol, dissolving almost all of the substance. 10.0 ml. of N sodium hydroxide solution are added, whereby the temperature rises to 50° C., and a clear solution is obtained. On cooling the solution in an ice bath, white crystals separate. After stirring overnight, the pH is adjusted to 4.1 by means of 0.6 ml. of N hydrochloric acid, and 20 ml. of water are added. The crystalline precipitate is isolated by filtration, and the cake of crystals is washed three times with 20 ml. portions of water, and twice with 10 ml. portions of ether, and finally dried at 100° C., yielding 1.43 g. of 1,3-dihydro-2H-1,4-benzodiazepine-2-one-4-oxide as white crystals decomposing at about 252° C. on the Kofler hot stage.

21 g. of 1,3 - dihydro-2H-1,4-benzodiazepine-2-one-4-oxide are dissolved at 0–5° C. in 152 ml. of 98% sulfuric acid. The solution is cooled to −5° C., and a mixture of 5.48 ml. of 100% nitric acid and 7.2 ml. of 98% sulfuric acid is added dropwise at between −2° C. and −7° C. with stirring. The mixture is further stirred for one hour at about 5° C. and then left for 15 hours at 4–5° C. Then the mixture is stirred into 1200 g. of finely crushed ice. Adding 470 ml. of ammonia at −4° C. brings the pH up to 7. The resulting suspension of crystals is stirred for one hour at a temperature between −5° C. and 0° C. and filtered. The crystals are washed three times with 60 ml. of ice water at a time, with three times 20 ml. of acetone, and once with 30 ml. of ether. The fine yellow crystals are dried for two hours at 90° C., and 21.1 g. of 7 - nitro - 1,3 - dihydro - 2H - 1,4 - benzodiazepine - 2-one-4-oxide are recovered, decomposing at 250° C. on the Kofler hot stage.

Calculated for $C_9H_7N_3O_4$ (221.2) (percent): C, 48.9; H, 3.2; N, 19.0. Found (percent): C, 48.8; H, 3.4; N, 19.0.

11.05 g. (0.05 mole) of the above 7-nitro compound are dissolved in 600 ml. of dry pyridine by heating to 60° C. The solution is cooled to 0° C. and 85 ml. (0.102 mole) of a 1.2 molar solution of phenyl magnesium bromide in ether are added dropwise with stirring during 30 minutes. The resulting dark orange suspension is kept at room temperature for 18 hours with stirring. After cooling to 0° C., the suspension is added with stirring to a mixture of 1000 g. of crushed ice and 600 ml. of concentrated hydrochloric acid, the temperature being kept below 5° C. 250 g. of sodium chloride are dissolved in the mixture, which is then washed four times with 600 ml. portions of ether. The united extracts are washed with 500 ml. of 3% sodium hydrogen carbonate solution. After drying over anhydrous magnesium sulphate, the ether is evaporated at reduced pressure, and the residue of 19 g. is stirred with 100 ml. of petrol (B.P. 40–60° C.).

The resulting suspension of crystals is filtered, and the crystals are washed with two portions of 25 ml. petrol, and dried at 50° C. and a pressure of 1 mm. Hg, yielding 11.93 g. of yellow crystals. Recrystallization from acetone gives 8.45 g. of 7 - nitro-1,3,4,5-tetrahydro-4-hydroxy-5-phenyl-2H-1,4-benzodiazepine-2-one as light yellow crystals with M.P. 220° C. (dec.).

Calculated for $C_{15}H_{13}N_3O_4$ (299.3) (percent): C, 60.2; H, 4.4; N, 14.0. Found (percent): C, 59.8; H, 4.6; N, 14.0.

EXAMPLE 2

0.30 g. (0.0010 mole) of the tetrahydro-benzodiazepine prepared according to Example 1 and 1.0 g. of acetamide were mixed and heated to 185–190° C. for 20 minutes and then cooled to room temperature. The resulting hard brown mass was crushed and stirred with 10 ml. of ice water, and another 35 ml. of water were added with stirring for 10 minutes at 0° C. after filtration, the filter cake was washed with three 10 ml. portions of water and dried for 30 minutes at 100° C. and 0.2 mm. Hg pressure, yielding 240 mg. of a brown powder. This powder was dissolved in 12 ml. of hot methanol, and the resulting dark brown solution was cooled to −20° C. and filtered. The filtrate was chromatographed on a 20 by 45 cm. glass plate carrying a 1.5 mm. layer of silica gel which had been activated by heating for 30 minutes at 120° C. Before development, the methanol was removed by heating the plate to 50° C. for 20 minutes. To ensure complete removal of the methanol, the plate was eluted for a short time with benzene which was removed in a cold stream of air. The plate was then developed for about one hour with acetonitrile whereby at least four compounds were separated. A 25 mm. broad colourless band in the middle of the chromatogram (made visible in ultraviolet light) was removed from the plate and extracted for one hour with ether in a Soxhlet type apparatus. Removal of the ether yielded 165 mg. of a yellow semi-solid material which was recrystallized from acetonitrile to yield 106 mg. of 7-nitro-1,3-dihydro-5-phenyl-2H-1,4-benzodiazepine-2-one as slightly yellow crystals melting at 225–226° C.

Calculated for $C_{15}H_{11}N_3O_3$ (281.3) (percent): C, 64.1; H, 3.9; N, 14.9. Found (percent): C, 64.0; H, 4.1; N, 14.8.

In similar manner is prepared 7-nitro-1,3-dihydro-5-(2'-trifluoromethylphenyl) - 2H - 1,4 - benzodiazepine-2-one with melting point 233° C.

EXAMPLE 3

1.0 g. (0.00334 mole) of 7-nitro-1,3,4,5-tetrahydro-4-hydroxy-5-phenyl - 2H - 1,4 - benzodiazepine-2-one were dissolved in 10 ml. of dry pyridine at 20° C. 0.73 ml. (0.0068 mole) of freshly distilled isocyanic acid phenyl ester were added on one portion with stirring. The clear light yellow solution was heated to 90° C. over a period of 25 minutes and kept at 90–95° C. for about 30 minutes until evolution of carbon dioxide had stopped. The solution was then evaporated to dryness at reduced pressure. The yellowish brown semi-crystalline residue was refluxed for 15 minutes with 25 ml. of methylene chloride, and the solution was cooled to 0° C. and filtered. The white crystals were washed with three portions of 2 ml. of cold methylene chloride and dried, yielding 0.655 g. of carbanilide. The combined filtrate and washings were evaporated to dryness at 60° C. under reduced pressure. The yellowish brown residue was stirred with 5 ml. of anhydrous boiling benzene to give a clear solution. After a few minutes, light yellow crystals separated, and the solution was left for some hours at 5° C. to complete crystallization. The crystals were filtered off, washed with three 0.5 ml. portions of cold benzene and dried at 50° C. and 1 mm. Hg pressure, yielding 0.651 g. of 7-nitro-1,3-dihydro-5-phenyl-2H-1,4-benzodiazepine-2-one as cream-coloured crystals melting at 220–223° C. Recrystallization from acetonitrile yielded almost white crystals melting at 226–227° C.

What is claimed is:

1. Method of producing 7-nitrosubstituted, 1,4-benzodiazepinones of the general formula:

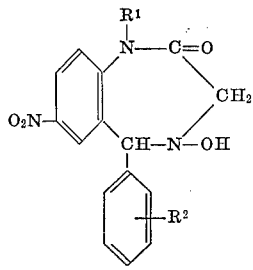

wherein $R^1$ is a member of the group consisting of hydrogen and alkyl groups of maximum 6 carbon atoms, and $R^2$ is a member of the group consisting of hydrogen, halogen, the trifluoromethyl group, and alkyl and alkoxy groups of maximum 6 carbon atoms, characterized in reacting a benzodiazepine-N-oxide of the general formula:

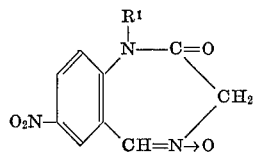

wherein $R^1$ is as hereinbefore defined, with a Grignard compound of the general formula

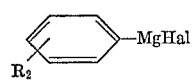

wherein $R^2$ is as hereinbefore defined, and Hal represents a halogen atom, in the presence of pyridine.

2. Method of producing 7-nitrosubstituted 1,4-benzodiazepinones of the general formula

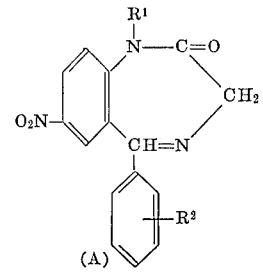

wherein $R^1$ is a member of the group consisting of hydrogen and alkyl groups of maximum 6 carbon atoms, and $R^2$ is a member of the group consisting of hydrogen, halogen, the trifluoromethyl group, and alkyl and alkoxy groups of maximum 6 carbon atoms, characterized in reacting a benzodiazepine-N-oxide of the general formula:

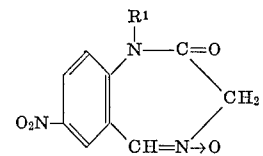

wherein $R^1$ is as hereinbefore defined, with a Grignard compound of the general formula

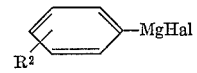

wherein $R^2$ is as hereinbefore defined, and Hal represents a halogen atom, in the presence of pyridine to produce a compound having the general formula:

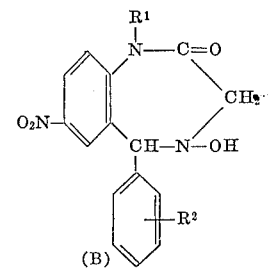

and subjecting compound (B) to dehydration in the presence of a dehydrating agent selected from the group consisting of acetamide and isocyanic acid phenyl ester.

3. The method of claim 1, in which acetamide is used as a dehydrating agent.

4. The method of claim 1, in which isocyanic acid phenyl ester is used as a dehydrating agent.

References Cited

FOREIGN PATENTS

| 647,702 | 8/1962 | Canada | 260—239.3 |
| 6608039 | 12/1966 | Netherlands | 260—239.3 |

HENRY R. JILES, Primary Examiner

R. T. BOND, Assistant Examiner